United States Patent
Fukuda et al.

(10) Patent No.: US 6,851,508 B2
(45) Date of Patent: Feb. 8, 2005

(54) MOTOR-OPERATED POWER STEERING DEVICE

(75) Inventors: Toshihiro Fukuda, Maebashi (JP); Shuji Endo, Maebashi (JP); Hiroshi Eda, Maebashi (JP); Osamu Tatewaki, Maebashi (JP); Kenichi Hayakawa, Maebashi (JP); Hirotaka Hatano, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/088,790

(22) PCT Filed: Jul. 23, 2001

(86) PCT No.: PCT/JP01/06319
§ 371 (c)(1),
(2), (4) Date: Aug. 12, 2002

(87) PCT Pub. No.: WO02/08047
PCT Pub. Date: Jan. 31, 2002

(65) Prior Publication Data
US 2003/0019686 A1 Jan. 30, 2003

(30) Foreign Application Priority Data

| Jul. 21, 2000 | (JP) | 2000-220404 |
| Jul. 21, 2000 | (JP) | 2000-220405 |

(51) Int. Cl.[7] ................................. B62D 5/04
(52) U.S. Cl. ................................. 180/444; 180/443
(58) Field of Search ................................. 180/446, 443, 180/444

(56) References Cited

U.S. PATENT DOCUMENTS

| 4,754,829 | A | | 7/1988 | Shimizu | 180/79.1 |
| 4,773,497 | A | | 9/1988 | Carlson et al. | |
| 4,825,972 | A | * | 5/1989 | Shimizu | 180/444 |
| 5,083,626 | A | | 1/1992 | Abe et al. | 180/79.1 |
| 5,590,732 | A | * | 1/1997 | Sugino et al. | 180/444 |
| 5,921,344 | A | * | 7/1999 | Boyer | 180/444 |
| 5,971,094 | A | * | 10/1999 | Joshita | 180/444 |
| 5,988,311 | A | * | 11/1999 | Kuribayashi et al. | 180/444 |
| 6,082,483 | A | | 7/2000 | Taniguchi et al. | 180/444 |
| 6,155,376 | A | * | 12/2000 | Cheng | 180/444 |
| 6,173,802 | B1 | * | 1/2001 | Kodaira et al. | 180/444 |
| 6,378,646 | B1 | * | 4/2002 | Bugosh | 180/444 |
| 6,427,799 | B1 | * | 8/2002 | Kodaira | 180/444 |
| 6,460,650 | B2 | * | 10/2002 | Tsuboi et al. | 180/444 |
| 6,644,432 | B1 | * | 11/2003 | Yost et al. | 180/444 |

FOREIGN PATENT DOCUMENTS

| EP | 0930214 A2 | 7/1999 |
| JP | 56-11136 | 1/1981 |
| JP | 62-127868 | 8/1987 |
| JP | 6-144246 | 5/1994 |
| JP | 8-207797 | 8/1996 |
| JP | H11-198822 | 7/1999 |
| JP | 2000-159128 | 6/2000 |
| JP | 2001-97232 | 4/2001 |

OTHER PUBLICATIONS

Combined Search and Examination Report dated Sep. 5, 2003 issued in a correspondence Great Britain application relating to U.S. Patent No. 4,773,497, 4 pgs.
Partial translation of Japanese Utility Model Application Laid–open No. 62–127868, 7 sheets.
Partial translation of Japanese Utility Model Application Laid–open No. 56–11136, 13 sheets.
Partial translation of Japanese Utility Model Application Laid–open No. 63–12471, 13 sheets.
Patent Abstracts of Japan; Publication No. 11–198822, publication date Jul. 27, 1999, 1 pg.

* cited by examiner

Primary Examiner—Daniel G. DePumpo
(74) Attorney, Agent, or Firm—Osha & May L.L.P.

(57) ABSTRACT

An electrically driven power steering apparatus is structured such that a large impact on a rack shaft (22) occurs upon an impingement of a steering stopper, and, even when an axial force acting on a ball bearing (25) of a presser member (30) becomes zero, a rotation of the presser member (30) is hindered by caulking c at a thin plate member (30b). Therefore, the presser member (30) does not slacken, and a predetermined axial force can be given again to the ball bearing (25) when the impact dissipates. The thus structured power steering apparatus exhibiting, though the cost is low, an excellent shockproof characteristic and capable of preventing the bearing from coming off a ball screw nut, can be provided.

13 Claims, 9 Drawing Sheets

MOTOR-OPERATED POWER STEERING DEVICE

TECHNICAL FIELD

The present invention relates to a vehicle power steering apparatus using an electric motor.

BACKGROUND ARTS

One known type of an electrically driven power steering apparatus of a vehicle is that a ball screw nut into which a rack shaft of a rack-and-pinion steering apparatus is inserted, is rotated by an electric motor coaxial with the rack shaft, and a rotational output thereof is converted into a thrust in the longitudinal direction of the rack shaft through a ball screw mechanism.

In this type of electrically driven power steering apparatus, the ball screw nut is so supported as to be rotatable with respect to a housing, which involves the use of bearings. These bearings are disposed at both side ends of the ball screw nut and provided with presser members for preventing the bearings from coming off the ball screw nut.

The presser member is formed with a female thread meshing with a male thread formed on an outer periphery of the ball screw nut. The presser member is thus screwed to the ball screw nut and thus prevents the bearing from coming off.

By the way, for example, in a general type of electrically driven power steering apparatus, a steering wheel, when rotating on, finally comes into contact with a steering stopper with the result that further rotations are hindered. If a driver energetically turns the steering wheel, however, an excessive impingement upon the steering stopper might occur. In such a case, an impact as strong as approximately 98.1 kN (10 tons) at the maximum might occur on the rack shaft.

Such a strong impact, when occurred, might exceed an initial axial force of the presser member for preventing the bearing from coming off the ball screw nut, and, when traveling oscillations are added, the presser member might slacken.

If the presser member is screwed to the ball screw nut with a strong toque in order to increase the initial axial force for preventing the presser member from slackening, a ball rolling path formed in the ball screw nut might deform large enough to cause a decline of function of the ball screw nut.

Further, the electrically driven power steering apparatus using the electric motor has been used in terms of saving a fuel cost over the recent years. In the electrically driven power steering apparatus, the electric motor supplied with the electric power from a battery supplies an assistive steering force, and therefore the power may not be taken out of an internal combustion engine directly. Hence, the fuel cost can be saved.

By the way, for instance, in the rack-and-pinion type electrically driven power steering apparatus, if a traveling wheel collides with a paved step of sidewalk during traveling of the vehicle, a large impact might be transferred to the rack shaft from tie rods. Such an impact is transferred tracing back a steering force transfer route and might exert a strong stress on the respective members. While on the other hand, a sufficient rigidity against such an impact is ensured, a problem is that the respective members increase both in sizes and weights.

DISCLOSURE OF THE INVENTION

It is an object of the present invention to provide an electrically driven power steering apparatus exhibiting, though the cost is low, an excellent shockproof characteristic and capable of preventing a bearing from coming off a ball screw nut.

It is another object of the present invention to provide an electrically driven power steering apparatus capable of relieving an impact.

An electrically driven power steering apparatus according to the present invention comprises a housing, a ball screw shaft extending within the housing and connected to a steering mechanism, an input shaft to which a steering force is inputted, an output shaft for receiving the steering force from the input shaft and outputting the steering force to the ball screw shaft, a torque sensor for detecting a torque transferred between the input shaft and the output shaft, a motor including a rotor, and a ball screw nut for giving a force in an axial direction to the ball screw shaft by receiving a rotational force from the motor, wherein an elastic member deforming and thus capable of absorbing an impact inputted from the side of the ball screw shaft, is disposed on a power transmission route between the ball screw shaft and the rotor of the motor. Such an impact can be relieved without bringing about increases both in sizes and weights of the respective members.

Further, in a case where the ball screw shaft is integral with the rack shaft, a load occurred on the traveling wheel in a way that depends on a condition of the surface of the traveling road, is transferred to the rack shaft, and consequently the rack shaft, i.e., the ball screw shaft might displace corresponding to this load in the axial direction. If the elastic member is not provided, however, such a displacement is hindered by a friction and an inertia of the motor. According to the present invention, however, the elastic member deforms, whereby the rack shaft can displace in the axial direction without being affected by the friction and inertia. As a result, the displacement is transferred to the rack shaft, a pinion, a steering shaft and a steering wheel, whereby the driver can be precisely informed of so-called road information such as the load occurred on the tire depending on the condition of the road surface, fluctuations thereof and so on.

Further, it is that the elastic member is disposed between the ball screw nut and the rotor of the motor, and the impact inputted from the side of the ball screw shaft is absorbed by a torsional damper effect.

Moreover, a displacement limiter for limiting a predetermined or larger quantity of deformation of the elastic member is provided and constructed of a recessed portion formed in one of the rotor of the motor and the ball screw nut and a protruded portion formed on the other, and the protruded portion, when the elastic member deforms by the predetermined quantity, engages with the recessed portion. With this contrivance, an excessive deformation of the elastic member is restrained, and a damage to this elastic member can be prevented.

An electrically driven power steering apparatus according to the present invention comprises a housing, a ball screw shaft extending within the housing and connected to a steering mechanism, an input shaft to which a steering force is inputted, an output shaft for receiving the steering force from the input shaft and outputting the steering force to the ball screw shaft, a torque sensor for detecting a torque transferred between the input shaft and the output shaft, a motor including a rotor, and a ball screw nut for giving a force acting in an axial direction to the ball screw shaft by receiving a rotational force from the motor, wherein an elastic member deforming and thus capable of absorbing an impact inputted from the side of the ball screw shaft, is disposed on a support portion of the ball screw nut. Such an impact can be relieved without bringing about the increases both in sizes and weights of the respective members.

Furthermore, it is preferable that the elastic member is disposed between the housing and a bearing for supporting the ball screw nut so as to be rotatable with respect to the housing or between the bearing and the ball screw nut.

The bearing and the housing relatively move in the axial direction corresponding to the axis-directional deformation of the elastic member, and there is provided a displacement limiter for limiting a predetermined or larger quantity of deformation of the elastic member by limiting the relative movements of the bearing and the housing in the axial direction. With this contrivance, an excessive deformation of the elastic member is restrained, and a damage to this elastic member can be prevented.

The rotor of the motor and the ball screw nut are connected by an engagement between a female spline and a male spline of which at least one toothed surface is coated with a resin. If the impact is transferred, an emission of butting noises can be effectively restrained.

It is preferable that the displacement limiter limits the predetermined or larger quantity of deformation of the elastic member at 40% or smaller of a maximum steering force exhibited by the motor.

It is also preferable that a natural oscillation frequency of a system constructed of the rotor, the ball screw nut and the elastic member is set to 7 Hz or higher.

An electrically driven power steering apparatus according to the present invention comprises a housing, a ball screw shaft extending within the housing and connected to a steering mechanism, a motor having a rotor, a ball screw nut, connected to the rotor of the motor, for converting a rotational force of the rotor into a force acting in an axial direction and transferring the same force to the ball screw shaft, a bearing for supporting the ball screw nut to as to be rotatable with respect to the housing, and a presser member, screwed to the ball screw nut, for thus pressing the bearing against the ball screw nut, wherein the presser member includes a connection member for connecting the presser member to the ball screw nut so that the presser member and the ball screw nut are unable to relatively rotate. If a large impact on the ball screw shaft occurs upon an impingement of a steering stopper, and even when an axial force acting on the ball bearing of the presser member becomes zero, a rotation of the presser member is hindered. Therefore, the presser member does not slacken, and a predetermined axial force can be given again to the bearing when the impact dissipates.

Further, it is preferable that the connection member connects the presser member to the ball screw nut so as to be unable to relatively rotate by use of a shearing force of a resinous material.

Moreover, it is preferable that the connection member connects the presser member to the ball screw nut so as to be unable to relatively rotate by use of a frictional force.

BEST MODE FOR CARRYING OUT THE INVENTION

Figure 1:
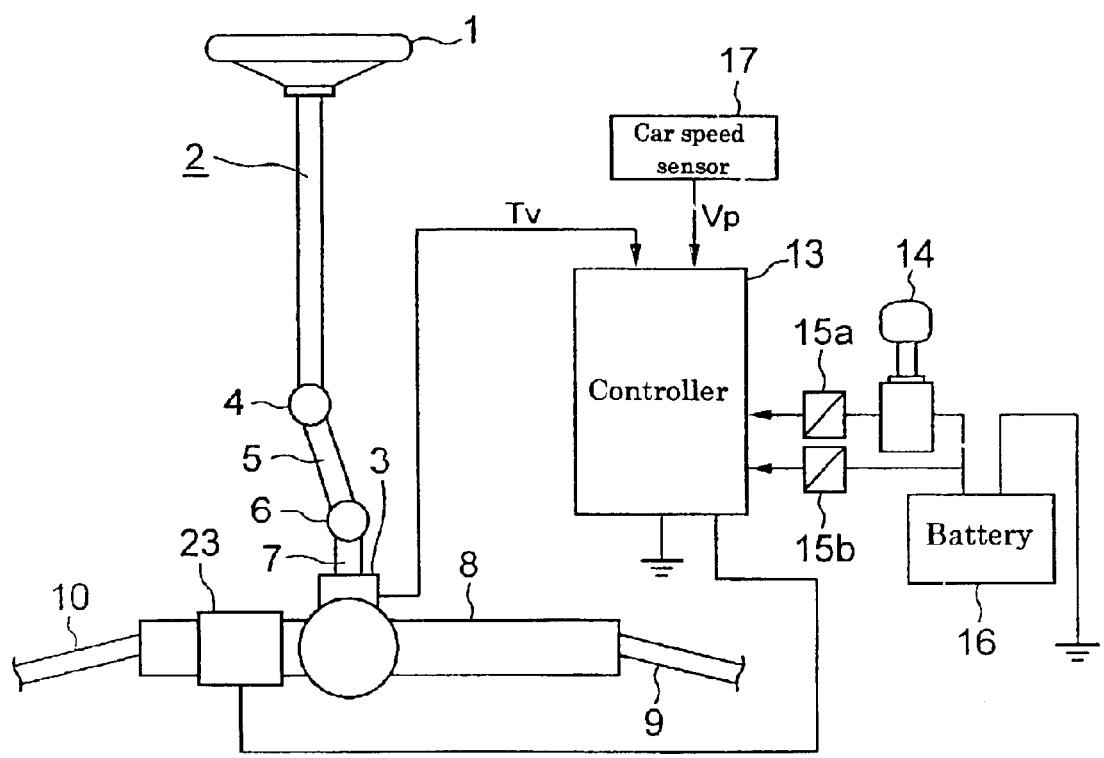
FIG. 1 is a schematic view showing a configuration of an electrically driven power steering apparatus in a first embodiment.

A first embodiment of the invention of the present application will hereinafter be described in depth with reference to the drawings. FIG. 1 is a schematic diagram showing an electrically driven power steering apparatus in the embodiment of the present invention. Referring to FIG. 1, a steering wheel 1 is connected to an upper side end of a steering shaft 2.

A lower side end of the steering shaft 2 is connected via a universal joint 4 to an upper side end of a lower shaft 5, and further a lower side end of the lower shaft 5 is connected via a universal joint 6 to an upper side end of a pinion shaft 7. An unillustrated pinion is connected to a lower side end of the pinion shaft 7 and meshes with rack teeth of a ball screw shaft, i.e., a rack shaft 22 (FIG. 22). A rack shaft coaxial type 5-phase rectangular wave driving type brushless motor 23 is disposed in a mode that will be explained later on in a rack housing 8 through which the rack shaft 22 is inserted.

A torque sensor 3 is disposed in the vicinity of the pinion shaft 7 and detects a steering torque transferred to the pinion shaft 7. The torque sensor 3 is structured to converts it into, for example, a displacement of torsion angle of a torsion bar (not shown) interposed between two-divided pinion shafts 7 and to magnetically mechanically detect this displacement of torsion angle. Accordingly, the torque sensor 3, when an operator steers the steering wheel 1, outputs, to a controller 13, torque detection signals Tv consisting of analog voltages corresponding to a magnitude of steering force and a steering direction.

Namely, the torque sensor 3, for instance, when the steering is in a neutral state, outputs a predetermined neutral voltage as the torque detection signal Tv. The torque sensor 3, if the steering wheel 1 is turned rightwards from this neutral state, outputs a voltage larger corresponding to a steering torque at this time than the neutral voltage, and, if the steering wheel 1 is turned leftwards, outputs a voltage smaller corresponding to a steering torque at this time than the neutral voltage.

The controller 13 is provided for controlling a drive of the motor 23 and controlling a steering assistive force for a steering system. The controller 13 is supplied with the power from a battery 16 mounted in a car and is thereby operated. A negative pole of the battery 16 is grounded, and its positive pole is connected to the controller 13 via an ignition switch 14 for starting an engine and a fuse 15a and directly connected to the controller 13 via a fuse 15b. The power supplied via this fuse 15b is used for backing up a memory. The controller 13 is capable of drive-controlling the brushless motor 23 on the basis of the torque detection signals Tv transmitted from the torque sensor 3 and, for example, car speed detection signal Vp transmitted from a car speed sensor 17 disposed on an output shaft of an unillustrated transmission.

Figure 2:
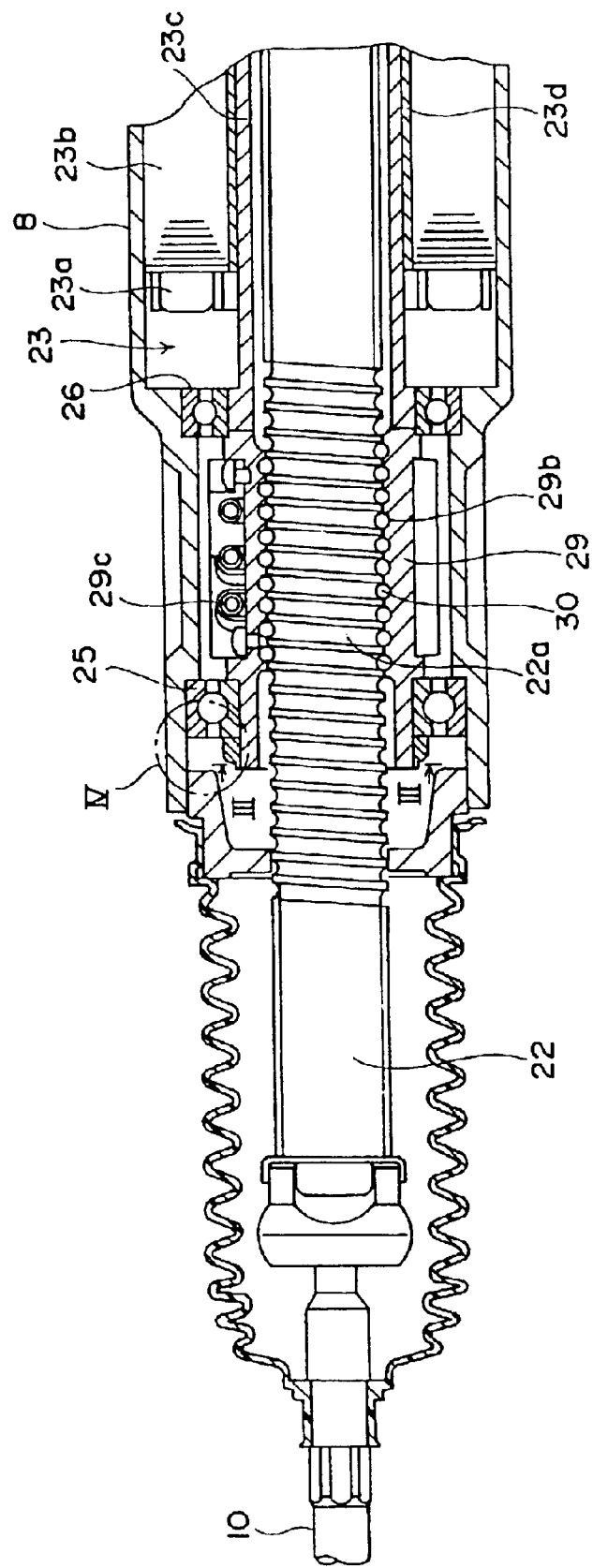
FIG. 2 is a sectional view taken in an axial direction, showing the periphery of a rack shaft coaxial type brushless motor in this embodiment.

FIG. 2 is a sectional view taken in an axial direction, showing the periphery of the rack shaft coaxial type brushless motor in the first embodiment. The housing, i.e., the rack housing 8 is fixed to an unillustrated car body through a bracket (not shown). The rack shaft 22 is inserted through within the rack housing 8 and connected at its two side ends to tie rods 9 (FIG. 1), 10. The tie rods 9, 10 are connected to an unillustrated steering mechanism.

A stator 23b taking a shape of circular tube is fixed within the rack housing 8, and a coil 23a constructed of a plurality of segments wound on a part of the stator 23b, is also provided therein. A rotor 23c taking a shape of long and thin circular tube is so provided as to insert into the stator 23b. A cylindrical magnet 23d for driving is provided facing to the stator 23b on an outer periphery of the rotor 23c. The drive magnet 23d is magnetized to for forming N- and S-poles alternately in the circumferential direction. The rack shaft 22 extends within the rotor 23c. Note that the stator 23b, the coil 23a, the rotor 23c and the drive magnet 23d constitute the brushless type electric motor 23.

The rotor 23c is so supported as to be rotatable along within the rack housing 8 by a ball bearing and an unillustrated bearing. Note that a rotor for detecting a phase is, though not illustrated, attached to the outer periphery of the rotor 23c. This phase detection rotor detects a polarity of the drive magnet 23d and is therefore disposed to have a given correlation with the polarity. This polarity phase is detected by a resolver R (FIG. 6) disposed adjacently to a position detecting magnet, and an electric signal indicating this polarity phase is outputted to the controller 13.

The controller 13 supplies and distributes the electric current sequentially to the segments of the respective coils 23a divided in the rotational direction, and as a result the brushless motor 23 is drive-controlled to generate a predetermined rotational output.

A left side end of the rotor 23c is connected to a right side end of a ball screw nut 29 taking substantially a circular tube-like shape. The ball screw nut 29 has an internal helical screw groove 29b formed inside, and the internal screw groove 29b forms a rolling path facing to an external screw groove 22a formed in a left side portion of the rack shaft 22, wherein a plurality of balls 30 are accommodated in the rolling path.

The balls are used for reducing a frictional force generated when the ball screw nut 29 and the rack shaft 22 relatively rotate. Note that the ball screw nut 29 has a circulation path 29c, wherein the balls 30 can be circulated through the circulation path 29c when the ball screw nut 29 rotates.

A left side end of the ball screw nut 29 is so supported by an angular contact type ball bearing 25 as to be rotatable along within the housing 8.

Figure 3:
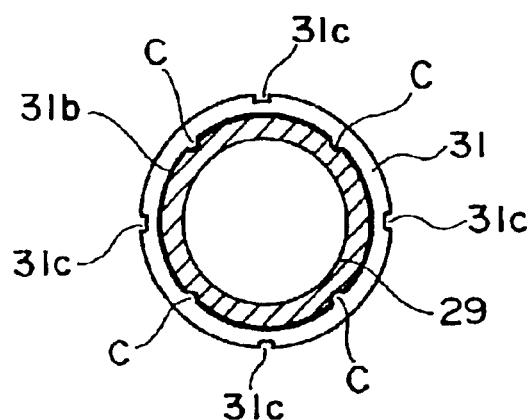
FIG. 3 is a view showing the configuration in FIG. 2, cut off by the line III—III as viewed in the arrow direction.
Figure 4:
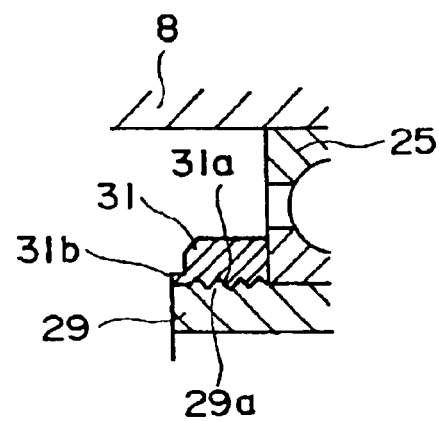
FIG. 4 is an enlarged view of a IV portion of the configuration in FIG. 2.

FIG. 3 is a view showing the configuration in FIG. 2, cut off by the line III—III as viewed in the arrow direction. FIG. 4 is an enlarged view of an IV portion of the configuration in FIG. 2. As illustrated in FIG. 4, a male thread 29a is formed on the outer periphery of the left side end of the ball screw nut 29. A right side end of a cylindrical presser member 31 formed with a female thread 31a meshing with the male thread 29a, is brought into contact with an inner ring of the bearing 25.

A distal end (a left side end in FIG. 4) of the presser member 31 is formed with a thin cylindrical portion 31b extending outward in the axial direction. Note that the outer periphery of the presser member 31 has, as shown in FIG. 3, four notches 31c formed at an equal interval in the peripheral direction. The notches 31c are used for rotating the presser member 31 in a way that engages with a till (not shown).

Next, an operation in this embodiment will be explained with reference to the drawings. Referring to FIG. 1, supposing that the vehicle travels straight and the steering force is not yet inputted to the rack shaft 22 from the steering wheel 1, the torque detection signal Tv outputted from the torque sensor 3 is zero or a low value, and hence the controller 13 does not perform the rotational control of the brushless motor 23. Accordingly, the present electrically driven power steering apparatus is in a state of not outputting the assistive steering force.

On the other hand, when the vehicle turns a curve, the steering wheel 1 is steered, and the steering force is transferred to the rack shaft 22. Therefore, the torque sensor 3 outputs the torque detecting signal Tv corresponding to a steering torque, and the controller 13 rotates the rotor 23c of the brushless motor 23 with a proper torque in a way that takes a detection signal Vp transmitted from the speed sensor 17 into consideration. When the rotor 23c rotates, the ball screw nut 29 also rotates with the result that the rack shaft 22 moves in the left or right direction, thereby generating the assistive steering force.

By the way, the presser member 31 is screwed to the ball screw nut 29 in order to prevent the ball bearing 25 from coming off the ball screw nut 29. If the presser member 31 is fastened with a strong torque for increasing an initial axial force in order to prevent a slack of the presser member 31, however, it follows that the circulation path 29c formed within the ball screw nut 29 deforms. This might cause a decline of function of the ball screw nut 29.

A contrivance to obviate this problem is, according to this embodiment, that the presser member 31 is screwed to the ball screw nut with a toque small enough not to cause the deformation of the circular path 29c, and thereafter the thin cylindrical portion 31b of the presser member 31 is caulked (C) in the radial direction and made to deform so as to be pressed strong against the male thread 29a of the ball screw nut 29. The presser member 31 is thereby so connected as to be impossible to a relative rotation with respect to the ball screw nut 29, and does not slacken even when the strong force is transferred from the rack shaft 22. In this embodiment, the caulking (C) configures a hindering means.

Figure 5:
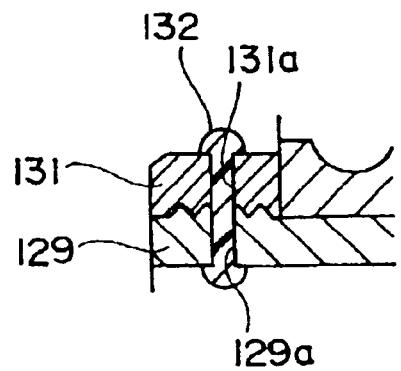
FIG. 5 is a sectional view of a side end of a ball screw nut, showing a modified example of this embodiment.

FIG. 5 is a sectional view of the side end of the ball screw nut, showing a modified example of this embodiment. Referring to FIG. 5, a presser member 131 and a ball screw nut 129 are formed with holes 131a, 129a penetrating therethrough in the radial directions. The presser member 131 is not formed with the thin cylindrical portion. Other points are the same as those in the embodiment discussed above, and hence their repetitive explanations are omitted.

In this modified example, after a proper pre-load is given by rotating the presser member 131, the holes 131a, 129a are filled with a molten resin 132. When the resin 132 defined as a hindering means is solidified, it follows that the presser member 131 is fixed to the ball screw nut 129 and does not slacken by dint of its shearing force and frictional force even when the strong force is transferred from the rack shaft 22.

Note that if desiring a decomposition of the ball bearing 25, the resin 132 is sheared when the presser member 131 is rotated by a strong force, and therefore the presser member 131 and the ball bearing 25 can be removed from the ball screw nut 129. When reassembling the components, the resin 132 is removed from the holes 129a, 131a, and the components may be assembled in the same steps.

Figure 6:
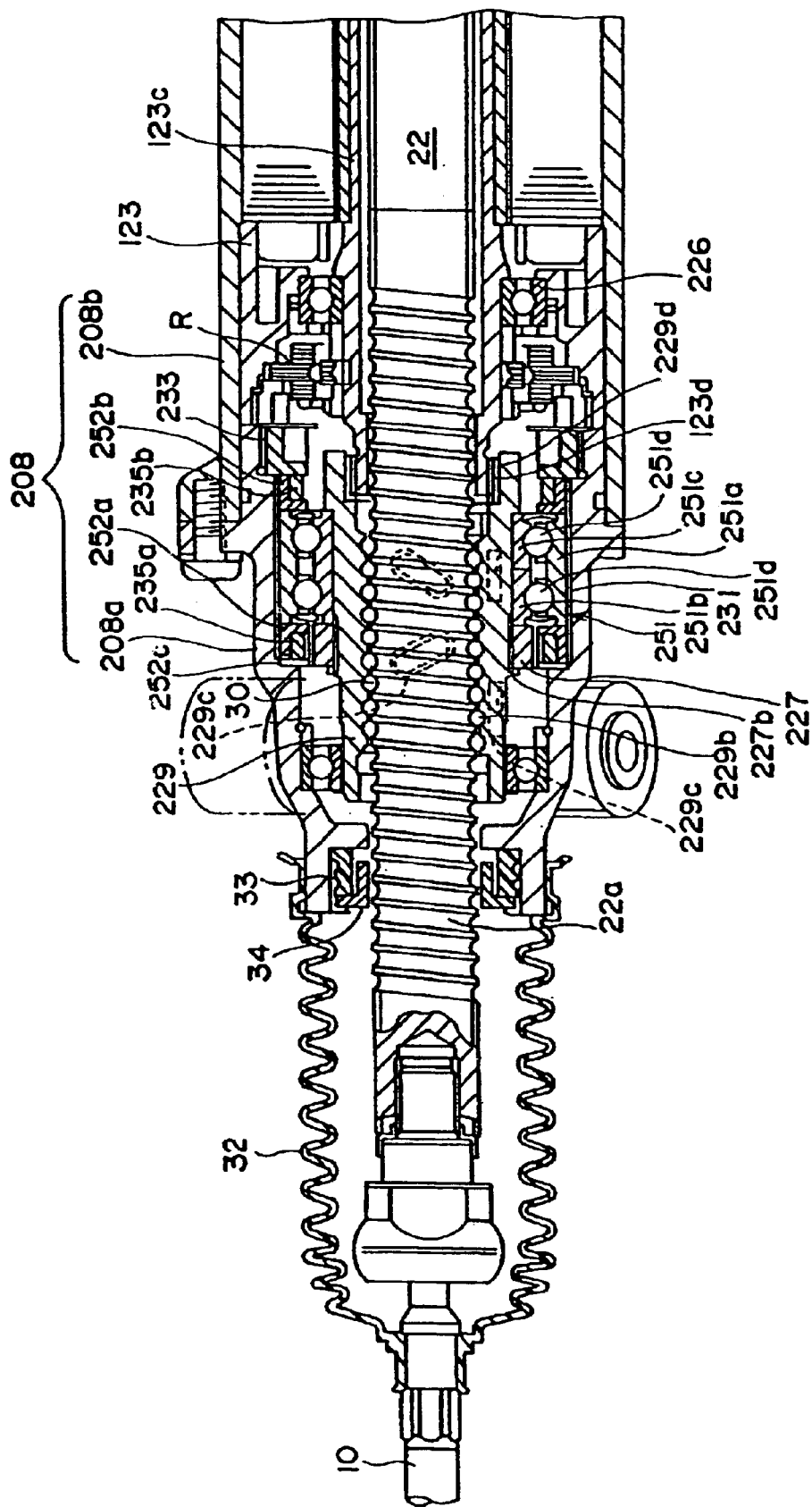
FIG. 6 is a sectional view taken in an axial direction, showing the periphery of the rack shaft coaxial type brushless motor in the electrically driven power steering apparatus in a second embodiment.

FIG. 6 is a sectional view taken in an axial direction, showing the periphery of the rack shaft coaxial type brushless motor in the electrically driven power steering apparatus in a second embodiment. Only a difference in the second embodiment is a configuration of the periphery of the ball screw nut. Therefore, the discussion will be focused on the configuration, and the same components as those in the first embodiment are marked with the same numerals of which the explanations are omitted. A rack housing 208 constructed of a small-diameter portion 208a and a large-diameter portion 208b is fixed to the unillustrated car body with an unillustrated bracket. The rack shaft 22 is inserted into the large-diameter portion 208b of the rack housing 208 and connected at its two side ends to tie rods 9 (FIG. 1), 10. The tie rods 9, 10 are connected to an unillustrated steering mechanism.

A rotor 123c of a brushless motor 123 inserted into the rack housing 208 is so supported by a bearing 226 as to be rotatable along within the rack housing 208. A left side end of the rotor 123c is spline-engaged with a right side end of a ball screw nut 229 taking substantially a shape of circular tube, and the rotor and the screw nut are, though integrally rotatable, relatively movable in the axial direction. A resin is coated over at least one of a toothed surface of a female spline 229d formed in the ball screw nut 229 (or the rotor 123c) and a toothed surface of a male spline 123d formed on the rotor 123c (or the ball screw nut 229) which are spline-engaged with each other. With this contrivance, when an impact is exerted such as impinging upon a steering stopper, the resin coating absorbs the impact, thus scheming to prevent an emission of butting noises. The ball screw but 229 has an internal helical screw groove 229b formed inside, and the internal screw groove 229b forms a rolling path facing to an external screw groove 22a formed in a left side portion of the rack shaft 22, wherein a plurality of balls 30 are accommodated in the rolling path.

The balls 30 are used for reducing a frictional force generated when the ball screw nut 229 and the rack shaft 22 relatively rotate. Note that the ball screw nut 229 has a circulation path 229c, wherein the balls 30 can be circulated through the circulation path 229c when the ball screw nut 229 rotates.

An angular contact type bearing 251 for rotatably supporting the ball screw nut 229 is provided along an inner periphery of the small-diameter portion 208a of the rack housing 208 via a thin cylindrical slide bush 231. The bearing 251 is constructed of an outer ring 251a, a couple of inner rings 251b, 251c and two trains of balls 251d disposed between the two rings.

A couple of flanged cylindrical core metals 252a, 252b each assuming an L-shape in section on one side are disposed in a way of coming into contact with the both side ends of the center ring 251a of the bearing 251. A ring-shaped elastic member 235a is disposed between the left-sided core metal 252a and a spacer fitted to the small-diameter portion 208a. On the other hand, a ring-shaped elastic member 235b is disposed between the left-sided core metal 252b and a nut 233 screwed to the small0diameter portion 208a.

The inner rings 251b, 251c of the bearing 251 are fitted to the ball screw nut 229 through a nut 227 screwed to the outer periphery of the left side end of the ball screw nut 229.

According to this embodiment, the nut 227 is screwed to the ball screw nut 229 with a torque small enough not to cause a deformation of the circulation path 229c, and thereafter the thin cylindrical portion 227b extending in the axial direction from the nut 227 is caulked in the radial direction so as to deform in a way of being pressed strong against the outer periphery of the ball screw nut 229. The nut 227 is thereby so connected as to be impossible of a relative rotation with respect to the ball screw nut 229, and does not slacken even when the strong force is transferred from the rack shaft 22.

According to this embodiment, if a large impact is exerted on the rack shaft 22 serving as the ball screw shaft such as an impingement upon the steering stopper and so on, the ball screw nut 229 is permitted to move together with the bearing 251 in the axial direction while being supported by the slide bush 231. In such a case, however, in addition to the above-described effect of the resin coating over the spline teeth, the elastic members 235a, 235b can effectively absorb the impact and restrain the emission of the butting noises.

The present invention has been discussed so far by way of the embodiments. The present invention should not, however, be construed as being limited to the embodiments described above and can be, as a matter of course, properly modified and improved. For example, the hindering means for preventing the presser member from slackening may be a filler, coated between the male thread and the female thread, for increasing the inter-thread frictional force.

Figure 7:
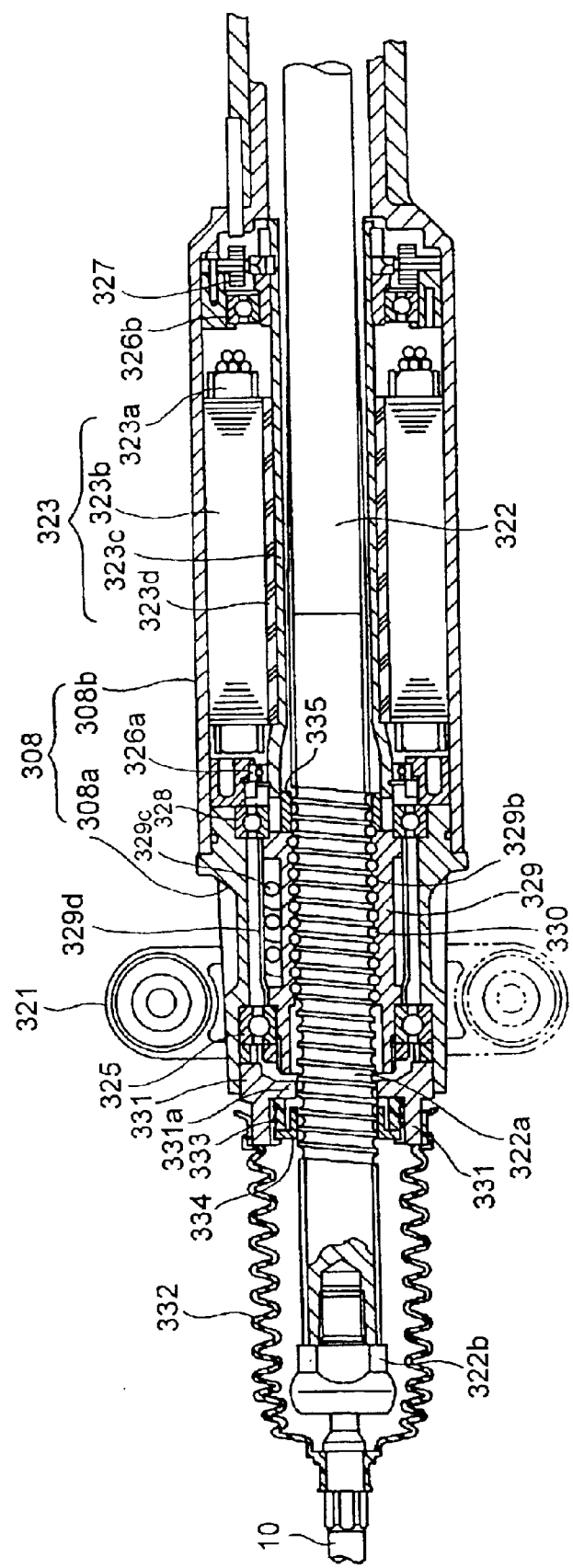
FIG. 7 is a sectional view taken in the axial direction, showing the periphery of the rack shaft coaxial type brushless motor in a third embodiment.

FIG. 7 is a sectional view taken in an axial direction, showing the periphery of the rack shaft coaxial type brushless motor in the electrically driven power steering apparatus in a third embodiment, A rack housing 208 constructed of a small0-diameter portion 308a and a large-diameter portion 308b is fixed to the unillustrated car body with a bracket 321 formed integrally with the small-diameter portion 308a. A rack shaft 322 is inserted into the large-diameter portion 308b of the rack housing 308 and connected at its two side ends to tie rods 9 (FIG. 1), 10. The tie rods 9, 10 are connected to an unillustrated steering mechanism. Note that the rack shaft 22 constitutes a ball screw shaft.

A stator 323b taking a shape of circular tube is fixed within the rack housing 308, and a coil 323a constructed of a plurality of segments wound on a part of the stator 323b, is also provided therein. A rotor 323c taking a shape of long and thin circular tube is so provided as to insert into the stator 323b. A cylindrical magnet 323d for driving is provided facing to the stator 323a on an outer periphery of the rotor 323c. The drive magnet 323d is magnetized to for forming N- and S-poles alternately in the circumferential direction. The rack shaft 322 extends within the rotor 323c. Note that the stator 323b, the coil 323a, the rotor 323c and the drive magnet 323d constitute the brushless type electric motor 323.

The rotor 323c is so supported as to be rotatable along within the rack housing 308 by bearings 326a, 326b. A resolver 327 for detecting a polarity phase is attached to the outer periphery of the rotor 23c in the vicinity of the bearing 326b. This resolver 327 is disposed to exhibit a given correlation with the polarity in order to detect the polarity of the drive magnet 323d. An electric signal indicating the polarity phase detected by the resolver 327 is outputted to the controller 13 (FIG. 1) via an unillustrated wire.

The controller 13 supplies and distributes the electric current sequentially to the segments of the respective coils 323a divided in the rotational direction, and as a result the brushless motor 323 is drive-controlled to generate a predetermined rotational output.

A left side end of the rotor 323c engages with a right side end of a ball screw nut 329 taking substantially a circular tube-like shape in a mode that will hereinafter be explained. The rotor 323c and the ball screw nut 329 rotate integrally. The ball screw nut 329 has an internal helical screw groove 329b formed inside, and the internal screw groove 329b forms a rolling path facing to an external screw groove 322a formed in a left side portion of the rack shaft 322, wherein a plurality of balls 330 are accommodated in the rolling path.

The balls 330 are used for reducing a frictional force generated when the ball screw nut 329 and the rack shaft 322 relatively rotate. Note that the ball screw nut 329 has a tube 329c serving as a circulation path formed inside, wherein the balls 330 can be circulated through the tube 329c when the ball screw nut 329 rotates. A cylindrical member 329d having a tube holding function and a function of preventing a leak of grease.

A left side end of the ball screw nut 329 is so supported by a 4-point contact type ball bearing 325 as to be rotatable with respect to the small-diameter portion 308a of the rack housing 308 as well as being regulated in its position in the axial direction. A right side end of the ball screw nut 329 is so supported by a ball bearing 328 as to be rotatable with respect to the small-diameter portion 308a of the rack housing 308.

A cylindrical member 331 having an inward flange 331a is screwed to a left side end of the small-diameter portion 308a of the rack housing 308. A bellow-shaped dust-proof boot 332 connects an outer periphery of the cylindrical member 331 to an outer periphery of the tie rod 10. A rack stroke damper 333, which is composed of a rubber or resin and has a groove formed in its outer periphery to get easy to deform, is fitted facing to the flange 331a inwardly of the cylindrical member 331 by use of a presser plate 334 taking substantially an L-shape in section. Even if the rack shaft 322 impinges upon the presser plate 334, the impingement of the side end 322b is damped by the rack stroke damper 333 disposed on the underside of the presser plate 334, thereby making it possible to prevent damages to the ball screw nut 329, the rack shaft 322 and the bearings 325, 328.

Figure 8:
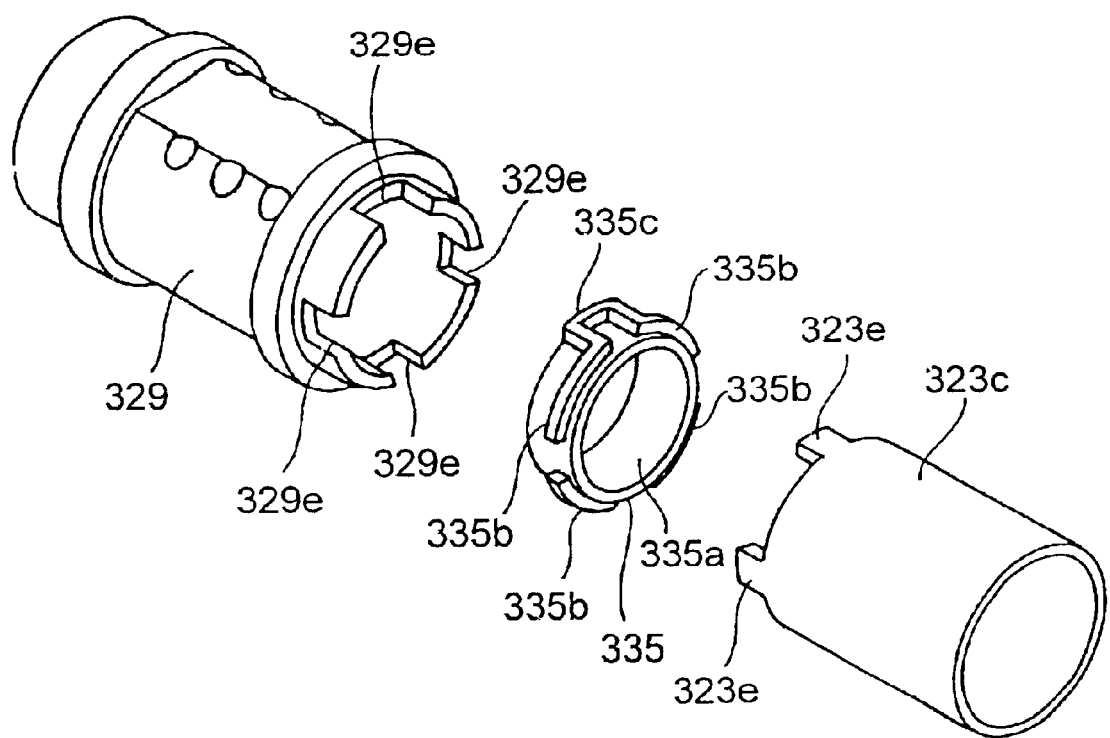
FIG. 8 is a perspective view showing the ball screw nut and a rotor of a motor in separation.

FIG. 8 is a perspective view showing the ball screw nut 329 and the rotor 323c of the motor 323 in separation. Referring to FIG. 8, four rectangular notches 329e are formed at an equal interval in the peripheral direction in the side end portion of the ball screw nut 329. On the other hand, rectangular protrusions 323e are formed at an equal interval in the peripheral direction on the side end portion, facing thereto, of the rotor 323c. A width (a length in the peripheral direction) of the notch 329e is set larger than a width (a length in the peripheral direction) of the protrusion 323e.

An elastic member 335 is disposed between the ball screw nut 329 and the rotor 323c. The elastic member 335 is constructed of a cylindrical core metal 335a, a rubber or resinous flange portion 335b welded to the outer periphery of the core metal 335a, and two elastic portions (elastic members) 335c each defined as substantially a C-shaped protrusion. An outside diameter of the core metal 335a is slightly smaller than an inside diameter of each of the ball screw nut 329 and of the rotor 323c. The flange portion 335b assumes a discontinuous configuration in the peripheral direction, corresponding to the protrusions 323e of the rotor 323c, and the elastic portions 335c are connected in a state where the (two) discontinuous portions (among the four discontinuous portions) of the flange portion 335b are shifted in the axial direction.

When the ball screw nut 329 and the rotor 323c are connected through the elastic members 335 serving as a connection member, the two face-to-face protrusions 323e of the rotor 323c engage with the notches 329e of the ball screw nut 329 with almost no clearance in a way that interposes the elastic portion 335c therebetween. On the other hand, the remaining two protrusions 323e of the rotor 323c engages with the notches 329e of the ball screw nut 329 with a predetermined clearance in the peripheral direction without any interposition of the elastic portion 335c. Note that the flange portion 335b is interposed between the end surface of the ball screw nut 329 and the end surface of the rotor 323c and hinders a direct contact of the ball screw nut 329 and the rotor 323c.

Next, an operation in this embodiment will be explained with reference to the drawings. Referring to FIG. 1, supposing that the vehicle travels straight and the steering force is not yet inputted to the rack shaft 322 FIG. 7) from the steering wheel 1, the torque detection signal Tv outputted from the torque sensor 3 is a neutral voltage or substantially neutral voltage, and hence the controller 13 does not perform the rotational control of the brushless motor 323 (FIG. 7). Accordingly, the present electrically driven power steering apparatus is in a state of not outputting the assistive steering force.

On the other hand, when the vehicle turns a curve, the steering wheel 1 is steered, and the steering force is transferred to the rack shaft 322. Therefore, the torque sensor 3 outputs the torque detecting signal Tv corresponding to a steering torque, and the controller 13 rotates the rotor 323c of the brushless motor 323 with a proper torque in a way that takes a detection signal Vp transmitted from the speed sensor 17 into consideration. When the rotor 323c rotates, the ball screw nut 329 also rotates with the result that the rack shaft 322 moves in the left or right direction, thereby generating the assistive steering force.

Herein, if the traveling wheel collides with a paved step of the sidewalk in the vicinity of the neutral position where the rack stroke damper 333 does not function, the impact is transferred to the rack shaft 322. In such a case, the elastic member 335 torsionally deforms and can thus absorb the impact. Further, when the ball screw nut 329 and the rotor 323c relatively rotate through predetermined or larger angles with the torsional deformation of the elastic member 335, the notch 329e as a recessed portion of the elastic portion 335c and the protrusion 323e as a protrusion, which function as a displacement limiter, are brought into contact with each other, thus preventing a damage to the elastic member 335 by limiting a further torsional deformation of the elastic member 335.

Note that a natural oscillation frequency of torsional oscillations in the system consisting of the rotor 323c and the ball screw nut 329 including the elastic member 335, is 5 Hz or higher, preferably 7 Hz or higher, more preferably 8 Hz or higher so that the resonance does occur in the system as a control system.

Figure 9:
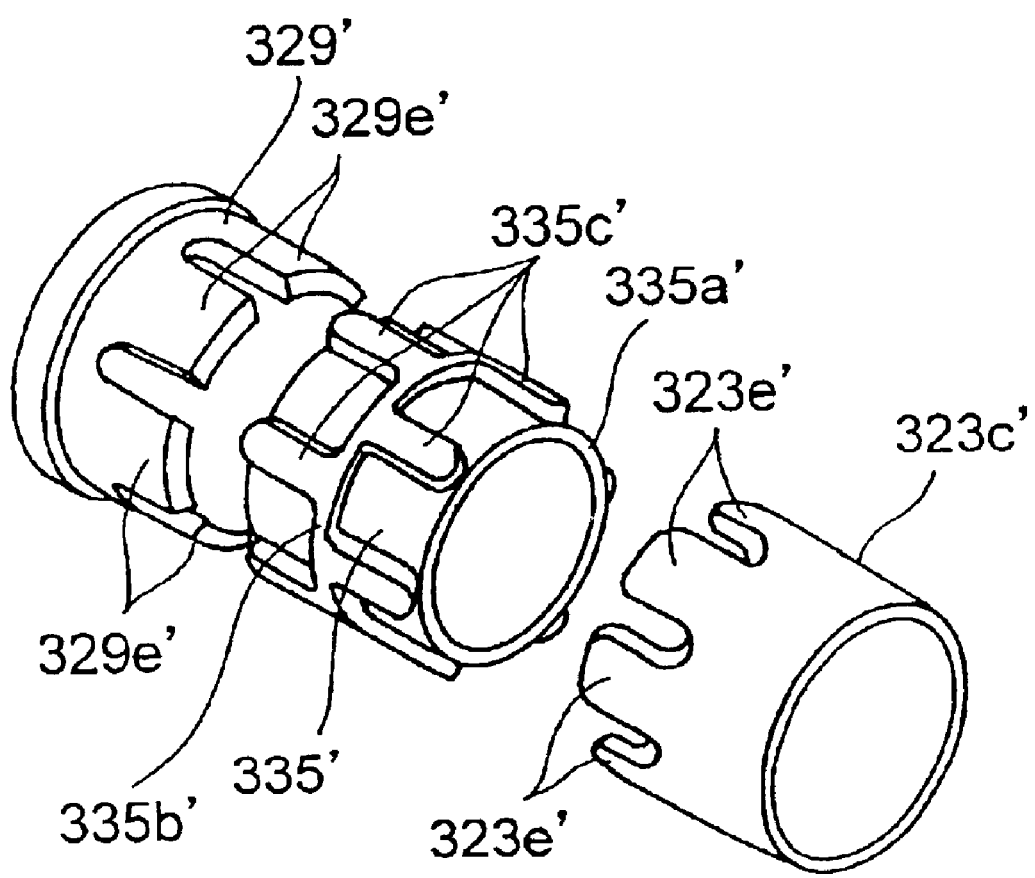
FIG. 9 is a perspective view showing a modified example of this embodiment.

FIG. 9 is a perspective view showing a modified example of this embodiment. Referring to FIG. 9, a side end of a ball screw nut 329' has rectangular protrusions 329e' formed at an equal interval in the peripheral direction. On the other hand, a side end, facing thereto, of a rotor 323c' has rectangular protrusions 323e' formed at an equal interval in the peripheral direction.

An elastic member 335' is disposed between the ball screw nut 329' and the rotor 323c'. The elastic member 335' is constructed of a cylindrical core metal 335a', a rubber or resinous flange portion 335b' extending over the entire outer periphery of the core metal 225a' in the peripheral direction at the center thereof, and a rubber or resinous engagement portion (elastic member) 225c' with its fingers alternately extending on both sides in the axial direction, this engagement portion being integral with the flange portion 335b'. An outside diameter of the core metal 335a' is slightly smaller than an inside diameter of each of the ball screw nut 329' and of the rotor 323c'.

When the ball screw nut 329' and the rotor 323c' are connected through the elastic members 335', the protrusion 329e' of the ball screw nut 329' engages with the engagement portion 335c' in a way that enters with almost no space, while the protrusion 323e' of the rotor 323c' also engages with the engagement portion 335c' in a way that enters with almost no space. At this time, the flange portion 335b' is interposed between the end surface of the ball screw nut 329' and the end surface of the rotor 323c' and hinders a direct contact of the ball screw nut 329' and the rotor 323c'.

In this modified example, if the traveling wheel collides with the paved step of the sidewalk and the impact is transferred to the rack shaft 322, the engagement portion 335c' of the elastic member 335' elastically deforms, thereby absorbing this impact.

Figure 10:
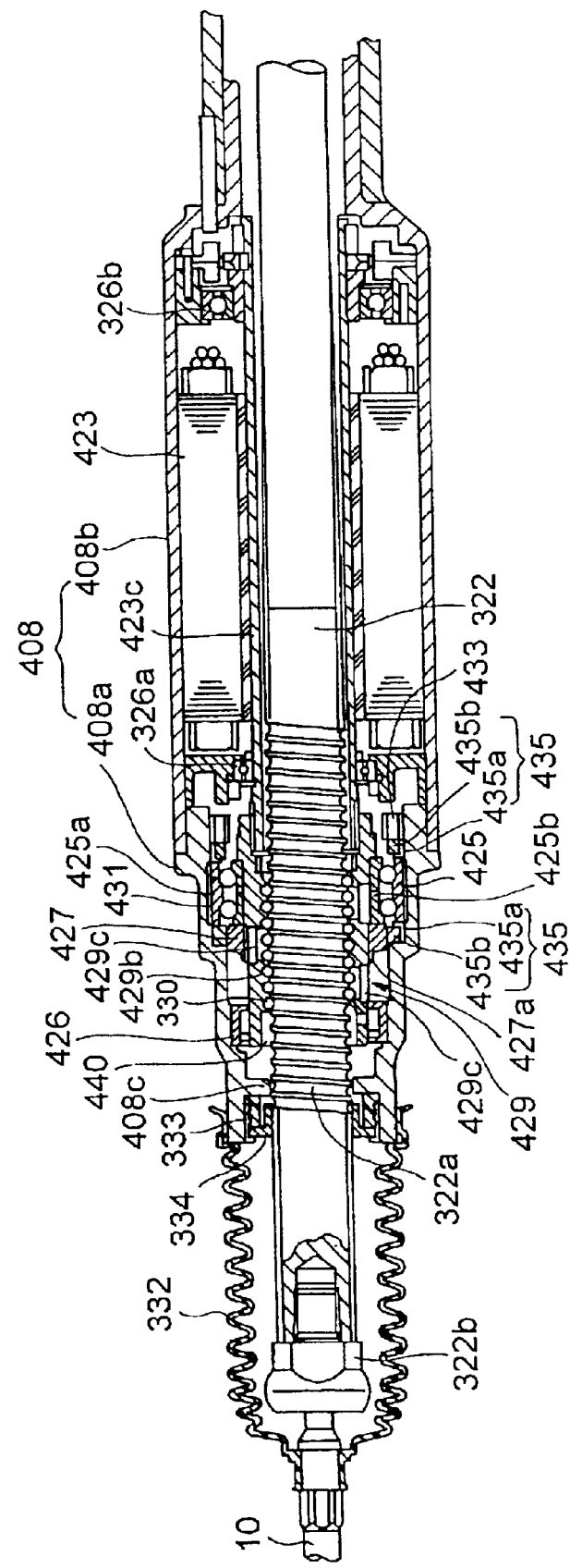
FIG. 10 is a sectional view taken in an axial direction, showing the periphery of the rack shaft coaxial type brushless motor in the electrically driven power steering apparatus in a fourth embodiment.

FIG. 10 is a sectional view taken in an axial direction, showing the periphery of the rack shaft coaxial type brushless motor in the electrically driven power steering apparatus in a fourth embodiment. Only difference in the fourth embodiment is a configuration of the periphery of the ball screw nut. Therefore, the discussion will be focused on this configuration, and the same components as those in the first embodiment are marked with the same numerals of which the explanations are omitted. A rack housing 408 constructed of a small-diameter portion 408a and a large-diameter portion 408b is fixed to the unillustrated car body with an unillustrated bracket. The rack shaft 322 is inserted into the large-diameter portion 408b of the rack housing 408 and connected at its two side ends to tie rods 9 (FIG. 1), 10. The tie rods 9, 10 are connected to an unillustrated steering mechanism.

A rotor 423c of a brushless motor 423 is so supported by bearings 326a, 326b as to be rotatable along within the rack housing 408. A left side end of the rotor 423c is spline-engaged with a right side end of a ball screw nut 429 taking substantially a shape of circular tube, and the rotor and the screw nut thereby integrally rotate. A resin is coated over at least one of toothed surfaces of female and male splines meshing with each other, thereby scheming to prevent an emission of butting noises. The ball screw but 429 has an internal helical screw groove 429b formed inside, and the internal screw groove 429b forms a rolling path facing to an external screw groove 322a formed in a left side portion of the rack shaft 322, wherein a plurality of balls 330 are accommodated in the rolling path.

The balls 330 are used for reducing a frictional force generated when the ball screw nut 429 and the rack shaft 322 relatively rotate. Note that the ball screw nut 429 has a circulation path 429c formed inside, wherein the balls 330 can be circulated through the circulation path 429c when the ball screw nut 429 rotates.

A rubber or resinous damping member 440 taking a configuration corresponding to the outer periphery of the rack shaft 322 is so fitted to the inner periphery of the left side end of the ball screw nut 429 as to come into contact with the outer periphery of the rack shaft 322. For example, if the rack shaft 322 is oscillated through the traveling wheel on the rugged surface of the road, the noises are generated when the balls 330 bounce by a backlash between the rolling surface and the ball 330 and impinge on the rolling surface. It is, however possible to restrain the emission of the noises by providing the damping member 440 to restrain the oscillations of the rack shaft 322 due to the impingement of the balls 330. Further, an inside-diametrical portion of the damping member 440 is formed with a male thread groove engaging with an external thread groove of the rack shaft 322, and this has a so-called sealing function of preventing the grease in the ball screw nut 429 from leaking outside.

The outer periphery in the vicinity of the right side end of the ball screw nut 429 is so supported by a plurality of trains of angular contact ball bearings 425 as to be rotatable with respect to the small-diameter portion 408a of the rack housing 408 and to be regulated in its position in the axial direction. On the other hand, the outer periphery of the left side end of the ball screw nut 429 is so supported by a roller bearing 426 as to be rotatable with respect to the small-diameter portion 408a of the rack housing 408.

An inner ring 425b of the angular contact ball bearing 425 is fitted by a nut 427 screwed to the outer periphery of the ball screw nut 429. The nut 427 will be explained later on. An outer ring 425a of the angular contact ball bearing 425 is attached to the inner periphery of the small-diameter portion 408a through a thin cylindrical slide bush 431. Each of elastic members 435 disposed in a state of being brought into contact with both sides of the outer ring 425a includes a flanged cylindrical core metal 435a taking substantially an L-shape in section on one side and fixed to the inner periphery of the small-diameter portion 408a, and a rubber or resinous elastic member 435b. Note that a thread member 433 coming into contact with the right-sided elastic member 435b is so fitted to the small-diameter portion 408a as to be adjustable in order to adjust an interval between the elastic members 435.

A bellow-shaped dust-proof boot 332 connects an outer periphery of the left side end of the small-diameter portion to an outer periphery of the tie rod 10. A rubber or resinous rack stroke damper 333 having a groove formed in its outer periphery to get easy to deform, is fitted facing to a flange 408c of the small-diameter portion 408a by use of a flanged cylindrical presser plate 334 taking substantially an L-shape in section on one side. Even if the rack shaft 322 energetically displaces and a swollen side end 322b of the rack shaft 322 impinges upon the presser plate 334, the impingement of the side end 322b is damped by the rack stroke damper 333 disposed on the underside of the presser plate 334, thereby making it possible to prevent damages to the ball screw nut 429 and the bearing 425.

If the traveling wheel collides with the paved step of the sidewalk in the vicinity of the neutral position where the rack stroke damper 333 does not function and the impact is transferred to the rack shaft 322, the elastic portion 435b of the elastic member 435 elastically deforms in the axial direction, whereby the impact can be absorbed.

Note that when the ball screw nut 429 and the rotor 423c relatively rotate through predetermined angles, further rotations thereof be, it is preferable, hindered by unillustrated stoppers. This is because, with this contrivance, a damage to the elastic portion 435b can be prevented by restraining an excessive deformation of the elastic portion 435b.

Moreover, according to this embodiment, the nut 427 is screwed to the ball screw nut 429 with the torque small enough not to cause the deformation of the circulation path 429c, and thereafter the thin cylindrical portion 427a extending in the axial direction from the nut 427 is caulked in the radial direction so as to deform in a way of being pressed strong against the outer periphery of the ball screw nut 429. The nut 427 is thereby so connected as to be impossible of a relative rotation with respect to the ball screw nut 429, and does not slacken even when the strong force is transferred from the rack shaft 322.

Figure 11:
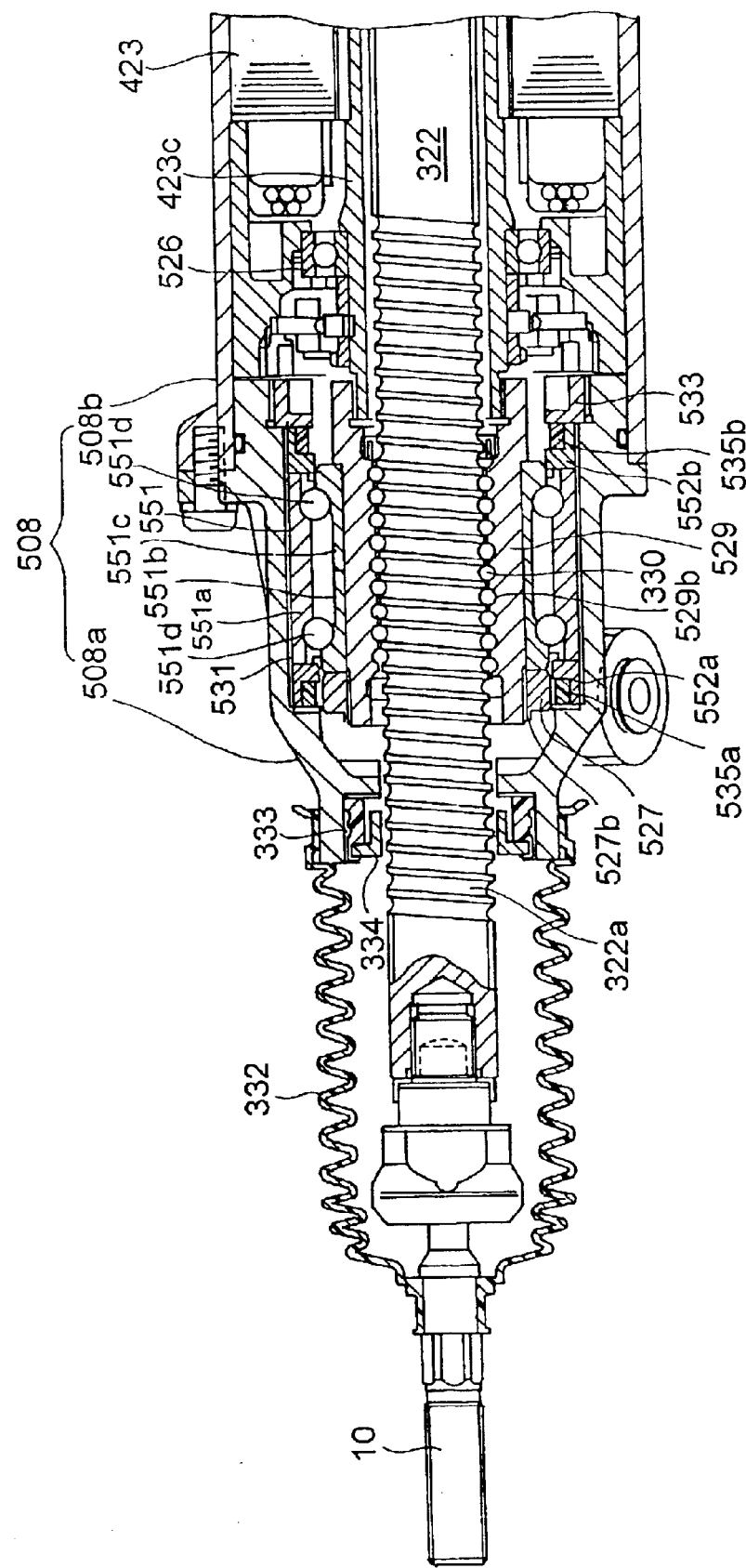
FIG. 11 is a sectional view taken in an axial direction, showing the periphery of the rack shaft coaxial type brushless motor in the electrically driven power steering apparatus in a fifth embodiment.

FIG. 11 is a sectional view taken in an axial direction, showing the periphery of the rack shaft coaxial type brushless motor in the electrically driven power steering apparat+us in a fifth embodiment. Only a difference in the fourth embodiment is a configuration of the periphery of the ball screw nut. Therefore, the discussion will be focused on this configuration, and the same components as those in the first embodiment are marked with the same numerals of which the explanations are omitted. A rack housing 508 constructed of a small-diameter portion 508a and a large-diameter portion 508b is fixed to the unillustrated car body with an unillustrated bracket. The rack shaft 322 is inserted into the large-diameter portion 508b of the rack housing 508 and connected at its two side ends to tie rods 9 (FIG. 1), 10. The tie rods 9, 10 are connected to an unillustrated steering mechanism.

A rotor 423c of a brushless motor 423 is so supported by bearings 526 as to be rotatable along within the rack housing 508. A left side end of the rotor 423c is spline-engaged with a right side end of a ball screw nut 529 taking substantially a shape of circular tube, and the rotor and the screw nut thereby integrally rotate. A resin is coated over at least one of toothed surfaces of female and male splines meshing with each other, thereby scheming to prevent an emission of butting noises. The ball screw but 529 has an internal helical screw groove 529b formed inside, and the internal screw groove 529b forms a rolling path facing to an external screw groove 322a formed in a left side portion of the rack shaft 322, wherein a plurality of balls 330 are accommodated in the rolling path.

The balls 330 are used for reducing a frictional force generated when the ball screw nut 529 and the rack shaft 322 relatively rotate. Note that the ball screw nut 529 has a circulation path (not shown) formed inside, wherein the balls 330 can be circulated through the circulation path 429c when the ball screw nut 529 rotates.

A bearing 551 for rotatably supporting the ball screw nut 529 is disposed on an inner periphery of the small-diameter portion 508a of the rack housing 508 through a thin cylindrical slide bush 531. The bearing 551 is constructed of an outer ring 551a, a couple of inner rings 551b, 551c and two trains of balls 551d disposed between the two rings.

A flanged cylindrical spacer 552a taking an L-shape in section on one side and an elastic member 535a are disposed between a left side end of the outer ring 551a of the bearing 551 and the small-diameter portion 508a. A flanged cylindrical spacer 552b taking an L-shape in section on one side and an elastic member 535b are disposed between a right side end of the outer ring 551a of the bearing 551 and a thread member 533 screwed to the small-diameter portion 508a. The inner rings 551b, 551c of the bearing 551 are fitted to the ball screw nut 529 by a nut 527 screwed to the outer periphery of the left side end of the ball screw nut 529. Note that an assembly width of the inner rings 551b, 551c is set larger than an axial range of top holes for circulating the balls, thereby scheming to prevent the leak of the grease and the tops from being removed.

If the traveling wheel collides with the paved step of the sidewalk in the vicinity of the neutral position where the rack stroke damper 333 does not function and the impact is transferred to the rack shaft 322, any one of the elastic members 535a, 535b elastically deforms in the axial direction, whereby the impact can be absorbed. Note that when each of the elastic members 535a, 535b deforms in excess of a predetermined quantity, a side end of the spacer 552a or 552b serving as a displacement limiter is bottomed, thereby limiting further deformations of the elastic members 535a, 535b.

Moreover, according to this embodiment, the nut 527 is screwed to the ball screw nut 529 with the torque small enough not to cause the deformation of the circulation path, and thereafter the thin cylindrical portion 527a extending in the axial direction from the nut 527 is caulked in the radial direction so as to deform in a way of being pressed strong against the outer periphery of the ball screw nut 529. The nut 527 is thereby so connected as to be impossible of a relative rotation with respect to the ball screw nut 529, and does not slacken even when the strong force is transferred from the rack shaft 322.

The present invention has been discussed so far by way of the embodiments. The present invention should not, however, be construed as being limited to the embodiments described above and can be, as a matter of course, properly modified and improved. For example, this embodiment has exemplified the coaxial type brushless motor, however, the present invention can be of course applied to the electrically driven power steering in which the motor shaft and rack shaft are independent, and the drive torque transmission therebetween is performed by a reduction gear and so on. Further, the present invention is not confined to this parallel geometry.

What is claimed is:

1. An electrically driven power steering apparatus comprising:
   a housing;
   a ball screw shaft extending within said housing and connected to a steering mechanism;
   an input shaft to which a steering force is inputted;
   an output shaft for receiving the steering force from said input shaft and outputting the steering force to said ball screw shaft;
   a torque sensor for detecting a torque transferred between said input shaft and said output shaft;
   a motor including a rotor; and
   ball screw nut for giving a force in an axial direction to said ball screw shaft by receiving a rotational force from said motor,
   wherein said ball screw shaft is supported by the nut only, and
   wherein a deformable elastic member capable of absorbing an impact inputted from the side of said ball screw shaft, is disposed on a power transmission route between said ball screw shaft and said rotor of said motor, and
   wherein said ball screw nut is displaced only in a rotational direction, in accordance with the elastic deformation of said elastic member.

2. An electrically driven power steering apparatus according to claim 1, wherein said elastic member is disposed between said ball screw nut and said rotor of said motor, and the impact inputted from the side of said ball screw shaft is absorbed by a torsional damper effect.

3. An electrically driven power steering apparatus according to claim 2, wherein a displacement limiter for limiting a predetermined or larger quantity of deformation of said elastic member is provided and constructed of a recessed portion formed in one of said rotor of said motor and said ball screw nut and a protruded portion formed on the other, and said protruded portion, when said elastic member deforms by the predetermined quantity, engages with said recessed portion.

4. An electrically driven power steering apparatus according to claim 1, wherein said elastic member is attached to a core metal.

5. An electrically driven power steering apparatus according to claim 1, wherein said elastic member is formed from a rubber or a resin.

6. An electrically driven power steering apparatus according to claim 1, wherein said elastic member is provided with at least a flange portion and a protrusion.

7. An electrically driven power steering apparatus according to claim 1, wherein said elastic member is provided with engaging portions alternatively extending axially.

8. An electrically driven power steering apparatus according to claim 1, wherein a diameter of said elastic member is less than a diameter of the nut.

9. An electrically driven power steering apparatus according to claim 1, wherein a member transmitting a torque through said elastic member extends along the axial direction of the nut.

10. An electrically driven power steering apparatus according to claim 1, wherein said torque sensor detects a torsion of said torsion bar connecting between the input shaft and the output shaft.

11. An electrically driven power steering apparatus according to claim 1, wherein said elastic member is provided at only one side of the ball screw nut.

12. An electrically driven power steering apparatus according to claim 1, wherein said ball screw nut is directly supported by said housing.

13. An electrically driven power steering apparatus according to claim 1, wherein said ball screw nut and said rotor are supported by at least one bearing.

* * * * *